United States Patent
Bahnasy et al.

(10) Patent No.: US 11,677,674 B2
(45) Date of Patent: *Jun. 13, 2023

(54) METHOD AND COMPUTING DEVICES FOR ENFORCING PACKET ORDER BASED ON PACKET MARKING

(71) Applicant: KALOOM INC., Montreal (CA)

(72) Inventors: Mahmoud Mohamed Bahnasy, LaSalle (CA); Per Andersson, Montreal (CA)

(73) Assignee: Kaloom Inc, Montreal (CA)

( * ) Notice: Subject to any disclaimer, the term of this patent is extended or adjusted under 35 U.S.C. 154(b) by 48 days.

This patent is subject to a terminal disclaimer.

(21) Appl. No.: 17/352,492

(22) Filed: Jun. 21, 2021

(65) Prior Publication Data
US 2021/0314271 A1    Oct. 7, 2021

Related U.S. Application Data

(63) Continuation of application No. 16/502,113, filed on Jul. 3, 2019, now Pat. No. 11,070,480.

(51) Int. Cl.
*H04L 47/31* (2022.01)
*H04L 45/28* (2022.01)
*H04L 45/00* (2022.01)

(52) U.S. Cl.
CPC .............. *H04L 47/31* (2013.01); *H04L 45/22* (2013.01); *H04L 45/28* (2013.01); *H04L 45/38* (2013.01)

(58) Field of Classification Search
CPC ... H04W 36/08; H04W 76/19; G06F 11/2023; G06F 11/3006; H04L 1/18; H04L 12/18; H04L 47/13; H04L 45/28
See application file for complete search history.

(56) References Cited

U.S. PATENT DOCUMENTS

| 10,142,248 | B2 | 11/2018 | Akhavain Mohammadi |
| 10,505,849 | B1 | 12/2019 | Iny et al. |
| 2017/0135014 | A1 | 5/2017 | Li et al. |
| 2017/0324664 | A1 | 11/2017 | Xu et al. |

(Continued)

FOREIGN PATENT DOCUMENTS

CN    110417569 A    11/2019

OTHER PUBLICATIONS

Sean Flack (Arista), L3 leaf spine networks and VXLAN, Nov. 25, 2015 HEAnet National Conference 2015 Slides 7-15.

*Primary Examiner* — Iqbal Zaidi
(74) *Attorney, Agent, or Firm* — IP Delta Plus Inc

(57) ABSTRACT

Method and computing devices for enforcing packet order based on packet marking. Upon occurrence of a link failure, a first device reallocates traffic initially forwarded through the failed link to an alternative link and marks the reallocated traffic with a first flag. Upon recovery of the failed link, the reallocated traffic is forwarded again through the recovered link and marked with a second flag different from the first flag. A second device calculates a reference inter-packet time for received traffic marked with the first flag. For received traffic marked with the second flag, the second device calculates a current inter-packet time. The current inter-packet time is compared with the reference inter-packet time, to determine if the traffic marked with the second flag shall be forwarded immediately or if the forwarding shall be delayed.

8 Claims, 15 Drawing Sheets

(56) References Cited

U.S. PATENT DOCUMENTS

| | | |
|---|---|---|
| 2019/0104206 A1 | 4/2019 | Goel et al. |
| 2019/0280922 A1 | 9/2019 | Andersson et al. |
| 2019/0281017 A1 | 9/2019 | Andersson et al. |
| 2020/0169494 A1 | 5/2020 | K et al. |
| 2020/0287637 A1* | 9/2020 | Zhang .................. H04B 7/0695 |

* cited by examiner

METHOD AND COMPUTING DEVICES FOR ENFORCING PACKET ORDER BASED ON PACKET MARKING

TECHNICAL FIELD

The present disclosure relates to the field of data centers. More specifically, the present disclosure relates to a method and computing devices for enforcing packet order based on packet marking.

BACKGROUND

Recent years have seen an increasing development of technologies such as Software as a Service (SaaS), cloud computing, etc. This development is fueled by a growing customer demand for products and services based on these types of technologies. This development is also fueled by constant progresses in underlying technologies, such as processing power increase for microprocessors, storage capacity increase for storage devices, and transmission capacity improvements for networking equipment. Furthermore, the average cost of these underlying technologies is falling. However, the decrease in the average cost of the underlying technologies is balanced by the increased customer demand, which requires to constantly update and upgrade the infrastructures used for providing SaaS or cloud computing.

The infrastructure used for providing SaaS or cloud computing is a data center, which combines a very large number of computing servers. Each server has a plurality of multi-core processors, and the combination of the computing servers provides a very high processing capacity, which is used by customers of the data center. Some or all of the servers may also have important storage capacities, so that the combination of the servers also provides a very high storage capacity to the customers of the data center. The data center also relies on a networking infrastructure, for interconnecting the servers and providing access to their computing and/or storage capacity to the customers of the data center. In order to provide a reliable service, very strong requirements in terms of scalability, manageability, fault-tolerance, etc., are imposed on the computing and networking infrastructure of the data center.

With respect to the networking infrastructure of the data center, it is well known that providing efficient and reliable networking services to a very large number of hosts is a complex task. Solutions and technologies have been developed in other contexts, such as networking technologies for providing mobile data services to a very large number of mobile devices. Some of these technologies have been standardized in dedicated instances, such as the Internet Engineering Task Force (IETF®) or the 3rd Generation Partnership Project (3GPP™). However, at least some of the technological challenges of deploying an efficient and reliable networking infrastructure in data centers are specific to the data center context; and need to be addressed with original solutions and technologies.

The networking infrastructure of a data center generally provides a plurality of paths for sending packets of an Internet Protocol (IP) flow from a first equipment to a second equipment. The different paths are supported by a plurality of communication links used by the first equipment for forwarding packets of multiple IP flows to the second equipment.

A load balancing algorithm can be implemented by the first equipment, to distribute the forwarding of the IP flows through the plurality of communication links. Upon failure of one among the plurality of communication links, the IP flows originally forwarded by the first equipment through the failed communication link are reallocated to one among the remaining communication links. Upon recovery of the failed communication link, the reallocated IP flows are forwarded again by the first equipment through the recovered communication link.

One drawback of this mechanism is that it may cause some packets of a given IP flow to arrive out of order at the second equipment. For example, a first packet of a given IP flow is sent on a reallocated communication link (the original link has failed) and the next packet of the given IP flow is sent on the original link (the original link has recovered). Due to traffic conditions between the first and the second equipment differing between the reallocated communication link and the original communication link, the next packet arrives before the first packet (out of order) at the second equipment.

Therefore, there is a need for a method and computing devices for enforcing packet order based on packet marking.

SUMMARY

According to a first aspect, the present disclosure relates to a computing device. The computing device comprises a plurality of communication interfaces providing access to a corresponding plurality of communication links and a processing unit. The processing unit transmits IP packets of an IP flow via a first communication interface among the plurality of communication interfaces providing access to a corresponding first communication link among the plurality of communication links. The processing unit determines a failure of the first communication link. Upon the determination of the failure, the processing unit marks the IP packets of the IP flow with a first flag. The processing unit further transmits the IP packets of the IP flow via a second communication interface among the plurality of communication interfaces providing access to a corresponding second communication link among the plurality of communication links. The processing unit determines a recovery of the first communication link. Upon the determination of the recovery, the processing unit marks the IP packets of the IP flow with a second flag different from the first flag. The processing unit further transmits the IP packets of the IP flow via the first communication interface providing access to the corresponding first communication link.

According to a second aspect, the present disclosure relates to a computing device. The computing device comprises at least one communication interface and a processing unit. The processing unit receives IP packets of an IP flow via the at least one communication interface. The processing unit determines that at least some of the IP packets of the IP flow are marked with a first flag. The processing unit calculates a reference inter-packet time for the IP packets of the IP flow marked with the first flag. The processing unit determines that at least some of the IP packets of the IP flow are marked with a second flag different from the first flag. The processing unit calculates a current inter-packet time for each IP packet of the IP flow marked with the second flag. For each IP packet of the IP flow marked with the second flag, if the corresponding current inter-packet time is substantially greater or equal than the reference inter-packet time, the processing unit immediately forwards the IP packet via the at least one communication interface. For each IP packet of the IP flow marked with the second flag, if the corresponding current inter-packet time is substantially lower than the reference inter-packet time, the processing unit delays a forwarding of the IP packet via the at least one communication interface by an amount of time.

According to a third aspect, the present disclosure relates to a method for enforcing packet order based on packet marking. The method comprises transmitting, by a processing unit of a first computing device, IP packets of an IP flow via a first communication interface of the first computing device providing access to a corresponding first communication link. The method comprises determining, by the processing unit of the first computing device, a failure of the first communication link. Upon determination of the failure, the method comprises marking, by the processing unit of the first computing device, the IP packets of the IP flow with a first flag. The method further comprises transmitting, by the processing unit of the first computing device, the IP packets of the IP flow via a second communication interface of the first computing device providing access to a corresponding second communication link. The method comprises determining, by the processing unit of the first computing device, a recovery of the first communication link. Upon determination of the recovery, the method comprises marking, by the processing unit of the first computing device, the IP packets of the IP flow with a second flag different from the first flag. The method further comprises transmitting, by the processing unit of the first computing device, the IP packets of the IP flow via the first communication interface of the first computing device providing access to the corresponding first communication link. The method comprises receiving, by a processing unit of a second computing device, IP packets of the IP flow. The method comprises determining, by the processing unit of the second computing device, that at least some of the IP packets of the IP flow are marked with the first flag. The method comprises calculating, by the processing unit of the second computing device, a reference inter-packet time for the IP packets of the IP flow marked with the first flag. The method comprises determining, by the processing unit of the second computing device, that at least some of the IP packets of the IP flow are marked with the second flag. The method comprises calculating, by the processing unit of the second computing device, a current inter-packet time for each IP packet of the IP flow marked with the second flag. The method comprises for each IP packet of the IP flow marked with the second flag, if the corresponding current inter-packet time is substantially greater or equal than the reference inter-packet time, immediately forwarding by the processing unit of the second computing device the IP packet. The method comprises for each IP packet of the IP flow marked with the second flag, if the corresponding current inter-packet time is substantially lower than the reference inter-packet time, delaying by the processing unit of the second computing device a forwarding of the IP packet by an amount of time.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to maintaining packet order when load balancing and link failure compensation procedures are used, in the context of a fabric of a data center.

Network Architecture of a Data Center

Referring now concurrently to FIGS. 1A, 1B, 2 and 3, the network architecture of a data center is illustrated. The network architecture represented in the Figures is for illustration purposes, and a person skilled in the art of designing data center architectures would readily understand that other design choices could be made. The teachings of the present disclosure are not limited to the topology of the network architecture represented in the Figures; but could also be applied to a network architecture with different design choices in terms of topology.

Figure 1A:
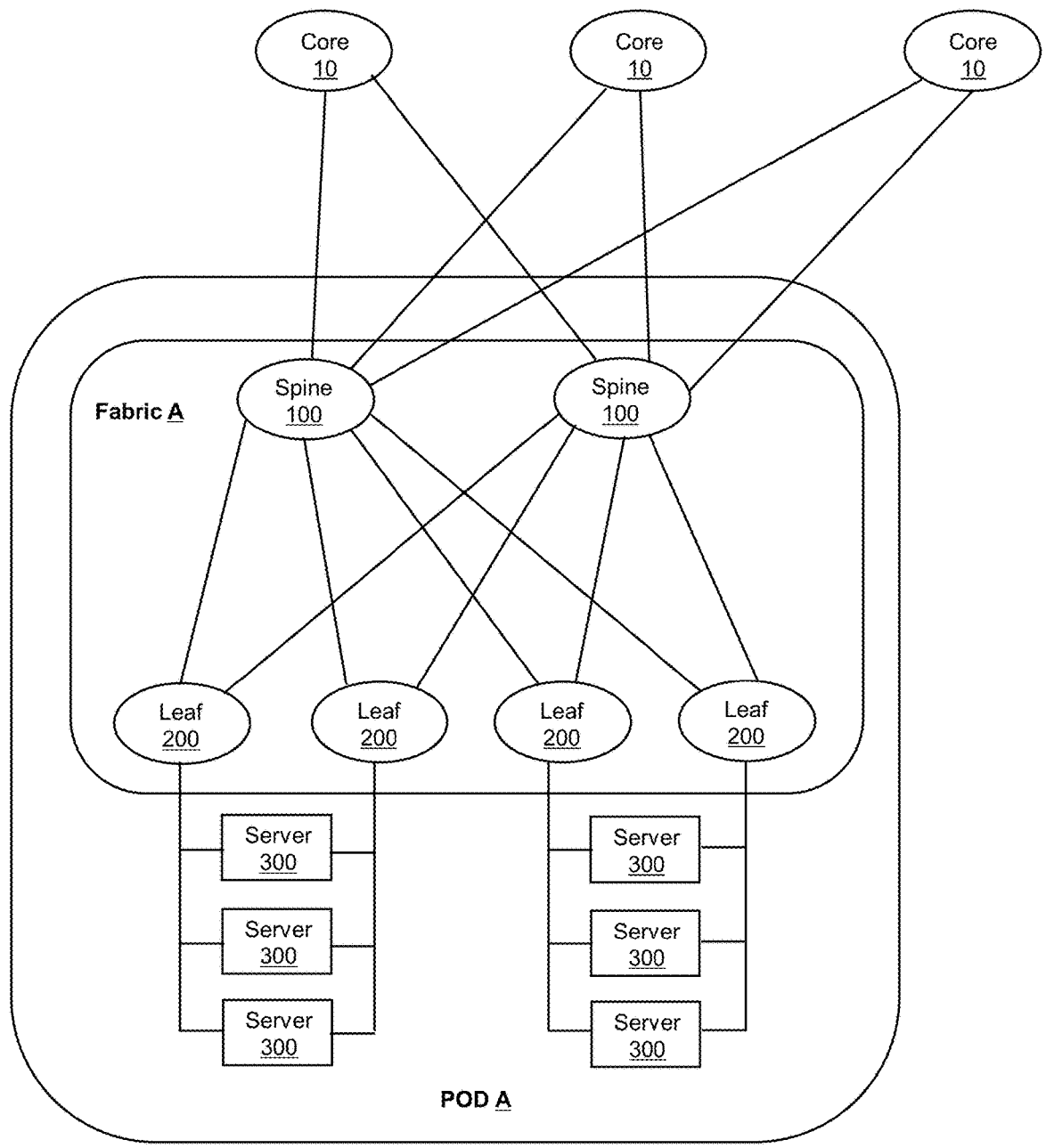
FIGS. 1A and 1B represent a network architecture of a data center comprising a plurality of pods and fabrics.
Figure 1B:
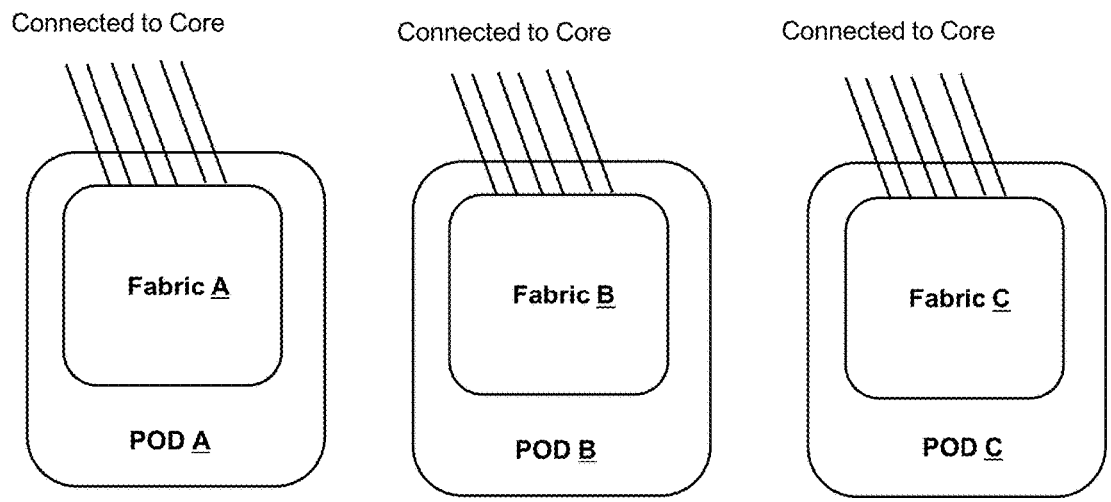

Reference is now made more particularly to FIGS. 1A and 1B. The data center is organized into a plurality of pods. Each pod consists of an atomic unit of computing, storage, networking and power. Each pod is designed as a unit, deployed as a unit, automated as a unit, and retired as a unit. Several types of pods may be available, which differ by their design. Zero, one or more instances of each type of pod is deployed in the data center. For illustration purposes, details of a single pod (A) have been represented in FIG. 1A and three pods (A, B and C) have been represented in FIG. 1B. However, the number of pods in the data center varies from one to tens or even hundreds of pods. The capacity in terms of computing, storage, networking and power of the data center is scaled, by adding (or removing) pods.

Pod A comprises a plurality of servers 300 providing the processing and storage power. The servers 300 are physically organized in one or more racks, depending on the number of servers 300 and the capacity of each rack. Pod A also comprises two hierarchical levels of networking power referred to as fabric A. Fabric A comprises a lower hierarchical level consisting of leaf networking equipment 200, and an upper hierarchical level consisting of spine networking equipment 100. The networking equipment (e.g. spine 100 and leaf 200) of fabric A are physically integrated to the one or more racks comprising the servers 300, or alternatively are physically organized in one or more independent racks.

The leaf networking equipment 200 and the spine networking equipment 100 generally consist of switches, with a high density of communication ports. Therefore, in the rest of the description, the leaf networking equipment 200 and the spine networking equipment 100 will be respectively referred to as leaf switches 200 and spine switches 100. However, other types of networking equipment may be used. For example, in an alternative implementation, at least some of the spine networking equipment 100 consist of routers.

Each leaf switch 200 is connected to at least one spine switch 100, and a plurality of servers 300. The number of servers 300 connected to a given leaf switch 200 depends on the number of communication ports of the leaf switch 200.

In the implementation represented in FIG. 1A, each server 300 is redundantly connected to two different leaf switches 200. A server 300 of a given pod (e.g. pod A) is only connected to leaf switches 200 of the fabric (e.g. fabric A) belonging to the given pod (e.g. pod A). A server 300 of a given pod (e.g. pod A) is not connected to leaf switches 200 of a fabric (e.g. fabric B) belonging to another pod (e.g. pod B). Each leaf switch 200 of a given fabric (e.g. fabric A) is connected to all the spine switches 100 of the given fabric (e.g. fabric A). A leaf switch 200 of a given fabric (e.g. fabric A) is not connected to a spine switch 100 of another fabric (e.g. fabric B). In an alternative implementation not represented in the Figures, at least some of the servers 300 are connected to a single leaf switch 200.

Each spine switch 100 is connected to at least one core networking equipment 10, and a plurality of leaf switches 200. The number of leaf switches 200 connected to a given spine switch 100 depends on design choices and on the number of communication ports of the spine switch 100. The core networking equipment 10 provide interworking between the fabrics deployed in the data center, connection to management functionalities of the data center, connection to external networks such as the Internet, etc. Furthermore, although not represented in the Figures for simplification purposes, at least some of the core networking equipment 10 may be connect to a pair of leaf switches 200.

The core networking equipment 10 generally consist of routers. Therefore, in the rest of the description, the core networking equipment 10 will be referred to as core routers 10. However, other types of networking equipment may be used. For example, in an alternative implementation, at least some of the core networking equipment 10 consist of switches.

In the implementation represented in FIG. 1A, each spine switch 100 of a given fabric (e.g. fabric A) is connected to all the core routers 10 and is connected to all the leaf switches 200 of the given fabric (e.g. fabric A).

For simplification purposes, fabric A represented in FIG. 1A only comprises two spine switches 100 and four leaf switches 200, while pod A only comprises two groups of three servers 300 respectively connected to leaf switches 200 of the fabric A. However, the number of spine switches 100 and leaf switches 200 of a fabric may vary, based on design choices and networking capabilities (e.g. communication port density) of the spine and leaf switches. Similarly, the total number of servers 300 of a pod may vary, based on design choices, based on the number of leaf switches 200 of the corresponding fabric, and based on networking capabilities (e.g. communication port density) of the leaf switches.

The details of pod B and its corresponding fabric B, as well as pod C and its corresponding fabric C, are not represented in FIG. 1B for simplification purposes. However, pod B/fabric B and pod C/fabric C include a hierarchy of spine switches 100, leaf switches 200 and servers 300 similar to the hierarchy illustrated for pod A/Fabric A.

Figure 2:
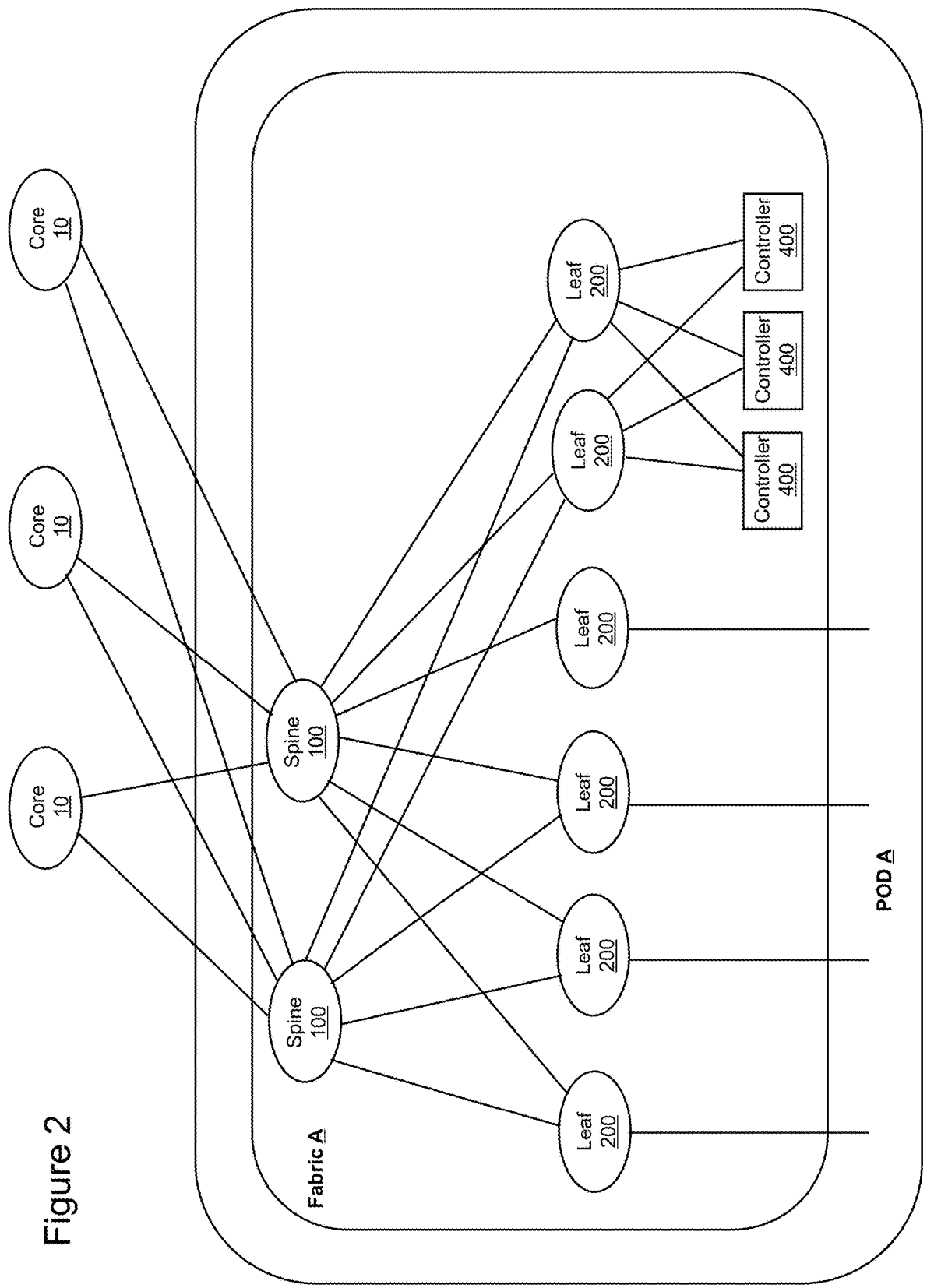
FIG. 2 represents a more detailed view of the fabrics represented in FIGS. 1A and 1B.

Reference is now made more particularly to FIGS. 1A, 1B and 2, where FIG. 2 represents an implementation of the data center of FIGS. 1A and 1B, where each fabric further includes one or more controllers 400. The servers 300 have not been represented in FIG. 2 for simplification purposes only.

The controllers 400 of a fabric are responsible for controlling operations of at least some of the nodes (e.g. leaf switches 200 and/or spine switches 100) included in the fabric. Each controller 400 is connected to at least one leaf switch 200. The number of controllers 400 deployed in a given fabric depends on design choices, on the required cumulative processing power of the controllers 400 deployed in the fabric, on the total number of leaf and spine switches deployed in the fabric, etc.

In the implementation represented in FIG. 2, each controller 400 is redundantly connected to two different leaf switches 200. For example, each controller 400 has a first operational connection to a first leaf switch 200, and a second backup connection to a second leaf switch 200. A controller 400 of a given fabric (e.g. Fabric A) is only connected to leaf switches 200 of the fabric (e.g. Fabric A). A controller 400 of a given fabric (e.g. Fabric A) is not connected to leaf switches 200 of another fabric (e.g. fabric B or C). Some leaf switches 200 are dedicated to being connected to controllers 400 (as illustrated in FIG. 2), while other leaf switches 200 are dedicated to being connected to servers 300 (as illustrated in FIG. 1A). In an alternative implementation, a leaf switch 200 is concurrently connected to servers 300 and controllers 400.

In another implementation, the controllers 400 are not directly physically connected to the leaf switches 200; but are functionally connected via at least one intermediate equipment such as an intermediate switch (not represented in FIG. 2) between the controllers 400 and the leaf switches 200.

Figure 3:
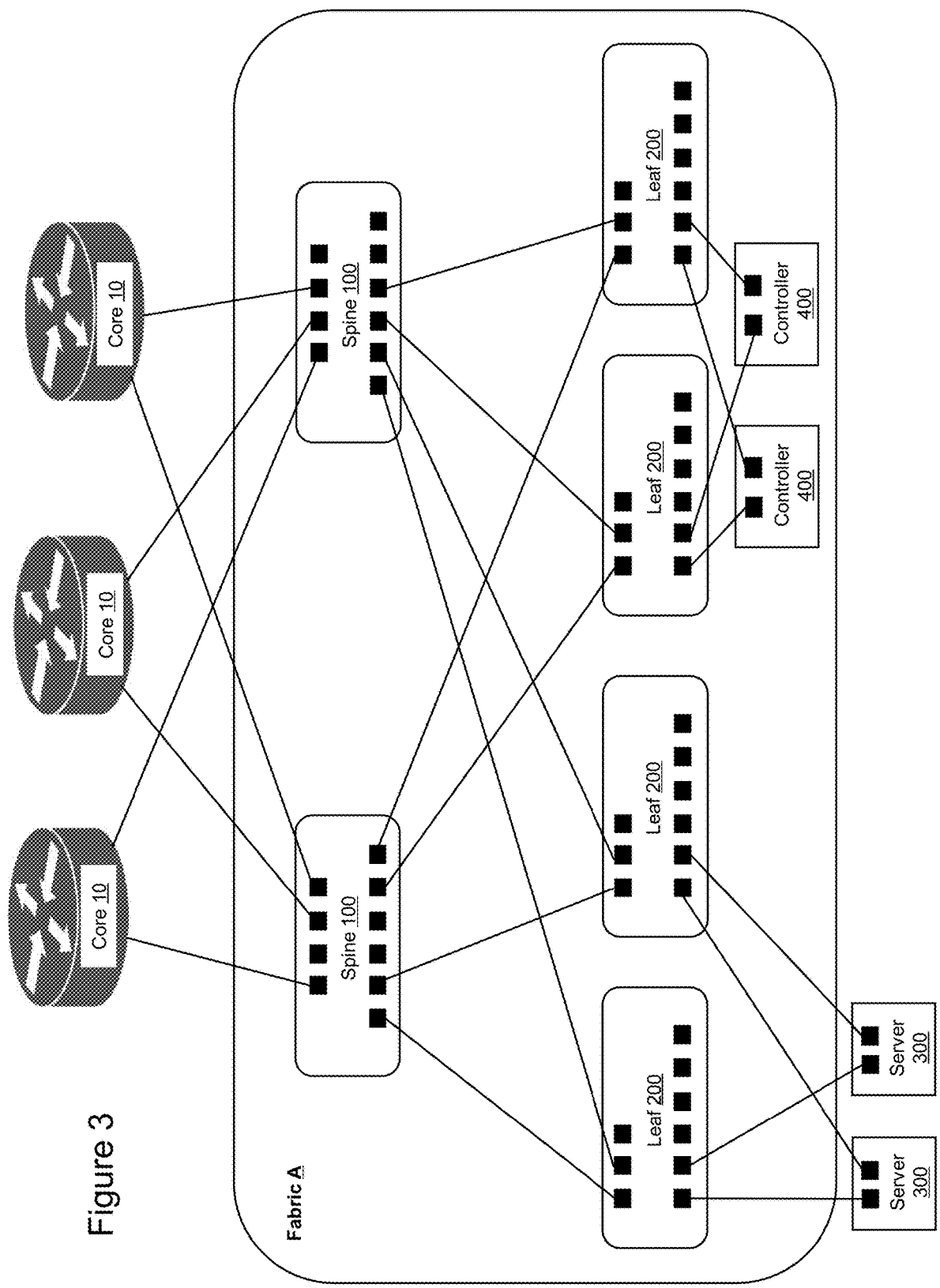
FIG. 3 represents communication ports of the equipment deployed in the pods and fabrics of FIGS. 1A-B and 2.

Reference is now made more particularly to FIGS. 1A, 1B, 2 and 3, where FIG. 3 represents communication ports of the equipment deployed in a fabric/pod.

The spine switches 100 have a dedicated number of uplink communication ports (e.g. 4 represented in FIG. 3) dedicated to the interconnection with the core routers 10, and a dedicated number of downlink communication ports (e.g. 6 represented in FIG. 3) dedicated to the interconnection with the leaf switches 200. The uplink and downlink ports have the same or different networking capabilities. For example, all the ports have a capacity of 10 Gigabytes (Gbps).

The leaf switches 200 have a dedicated number of uplink communication ports (e.g. 3 represented in FIG. 3) dedicated to the interconnection with the spine switches 100, and a dedicated number of downlink communication ports (e.g. 6 represented in FIG. 3) dedicated to the interconnection with the servers 300 or controllers 400. The uplink and downlink ports have the same or different networking capabilities. For example, all the uplink ports have a capacity of 100 Gbps and all the downlink ports have a capacity of 25 Gbps. In the future, the capacity of the uplink ports will reach 200 or 400 Gbps, while the capacity of the downlink ports will reach 50 Gbps or 100 Gbps.

The leaf and spine switches generally consist of equipment with a high density of communication ports, which can reach a few dozens of ports. Some of the ports may be electrical ports, while others are fiber optic ports. As mentioned previously, the ports of a switch may have varying networking capabilities in terms of supported bandwidth. Switches with different networking capabilities and functionalities are generally used for implementing the leaf switches and the spine switches. The ports are not limited to communication ports, but also include enclosures for connecting various types of pluggable media.

By contrast, the servers 300 and controllers 400 are computing devices similar to traditional computers, with a limited number of communication ports. For example, each server 300 and each controller 400 comprises two communication ports, respectively connected to two different leaf switches 200. The two communication ports generally consist of Ethernet ports, with a capacity of for example 10 Gbps. However, the servers 300 and/or controllers 400 may include additional port(s).

All the aforementioned communication ports are bidirectional, allowing transmission and reception of data.

Enforcement of Packet Order Based on Packet Marking

Figure 4A:
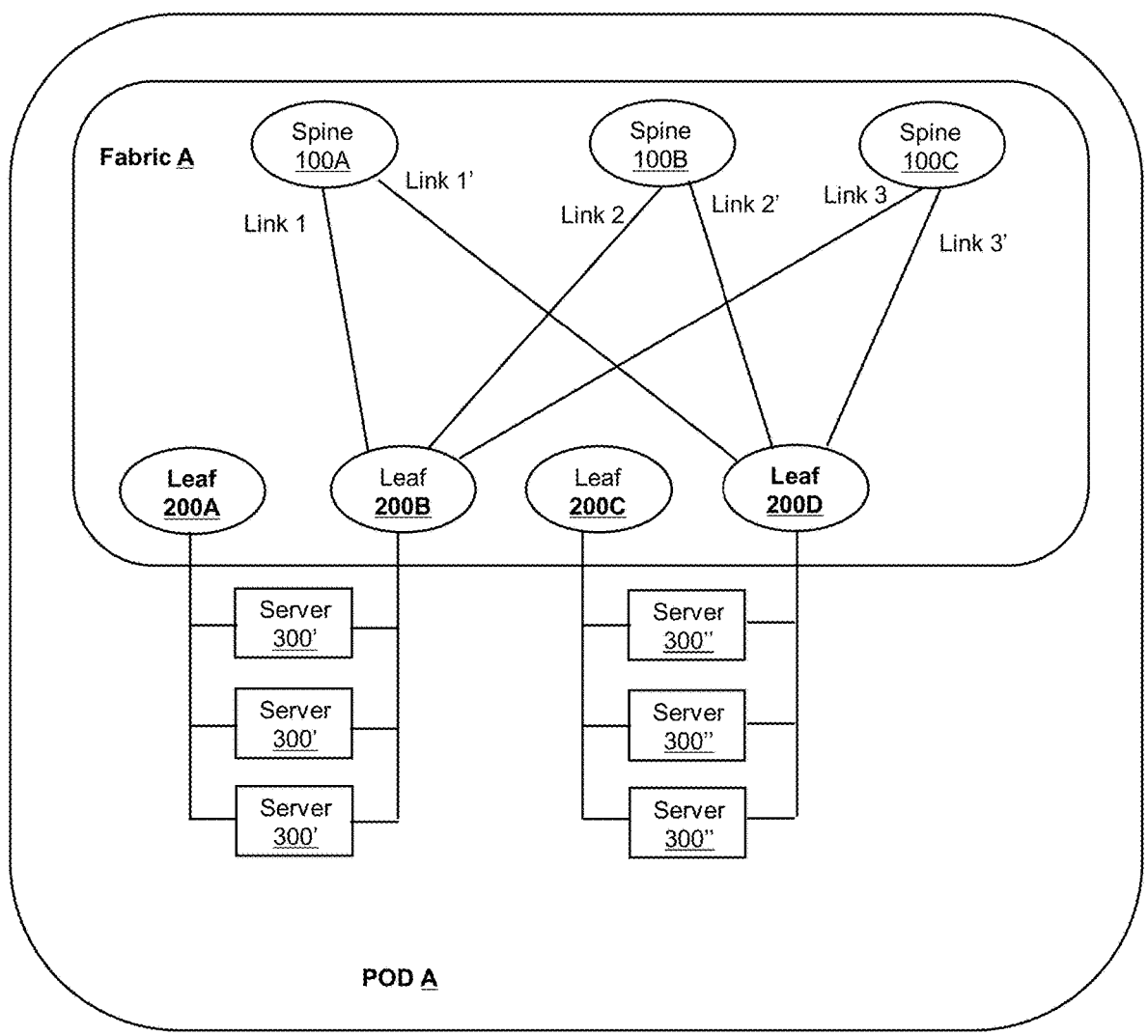
FIGS. 4A, 4B, 4C and 4D represent load balancing and link failure compensation applied to equipment of the fabric represented in FIGS. 1A, 2 and 3.
Figure 4B:
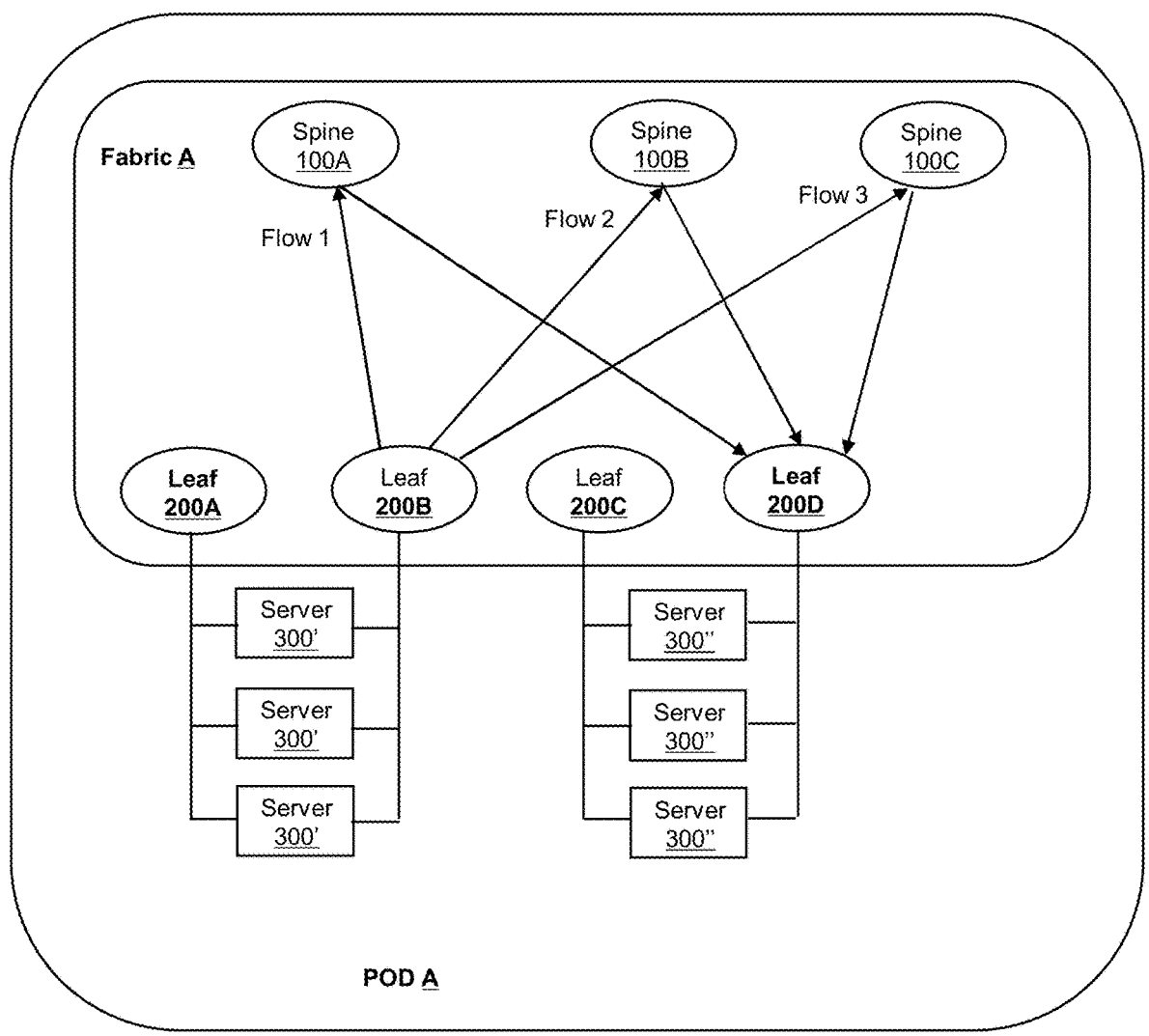
Figure 4C:
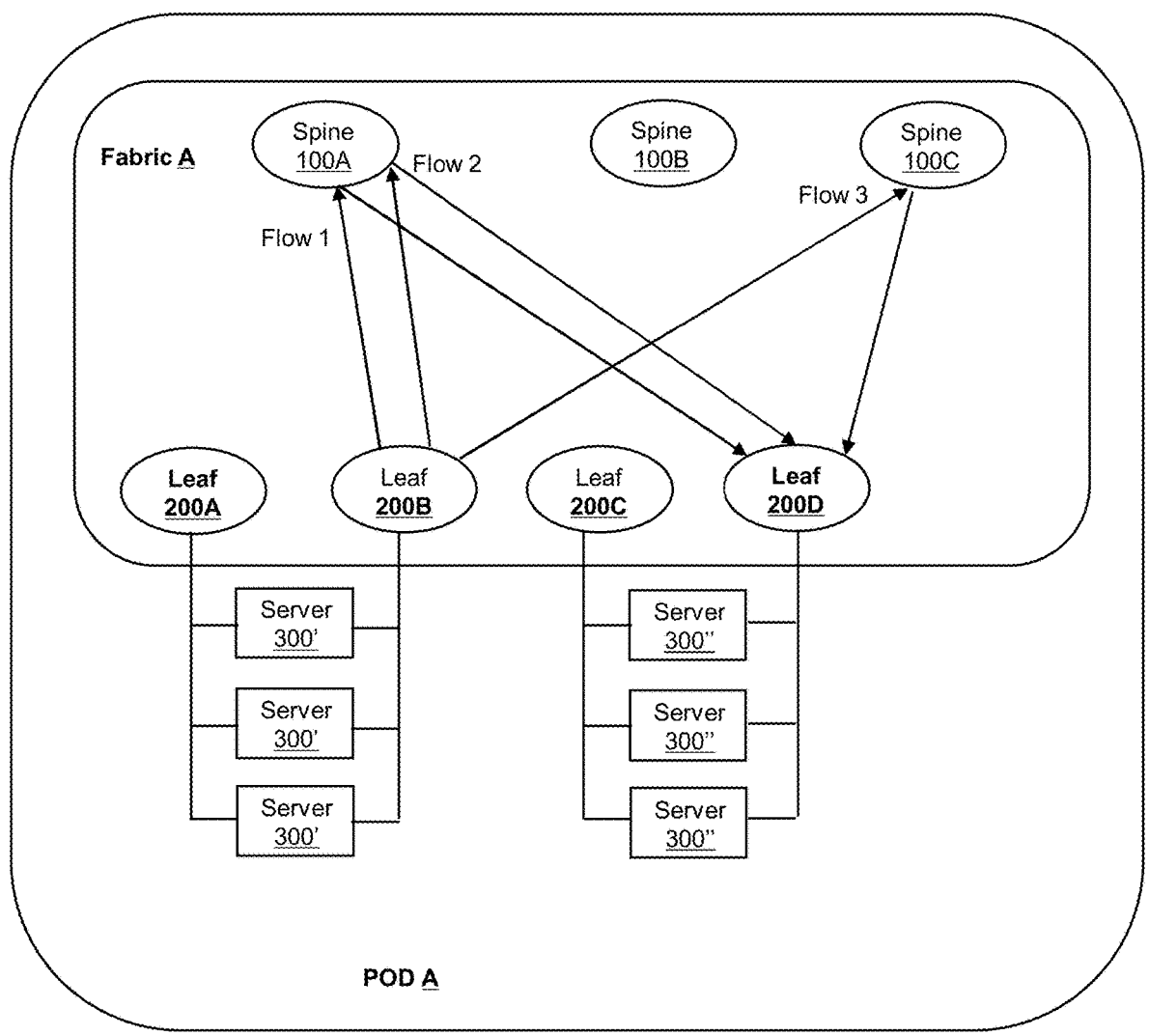

Reference is now made to FIGS. 4A, 4B and 4C, which represent the Fabric A and Pod A of FIG. 1A.

Fabric A comprises at least four leaf switches, which are labelled 200A, 200B, 200C and 200D. Fabric A comprises at least three spine switches, which are labelled 100A, 100B and 100C.

For exemplary purposes, we consider traffic exchanged between leaf switches 200B and 200D, via one of the spine switches 100A, 1006 and 100C.

As illustrated in FIG. 4A, leaf switch 200B is connected respectively to spine switch 100A through a first communication link 1, to spine switch 100B through a second communication link 2, and to spine switch 100C through a third communication link 3.

The server 300' and 300" correspond to the servers 300 represented in FIGS. 1A and 3. The server 300' are connected at least to leaf switch 200B and the servers 300" are connected at least to leaf switch 200D. For illustration purposes, we consider exchanges of data between the server 300' and 300" including the leaf switches 200B and 200D in the path.

Traffic received from one of the servers 300' by leaf switch 200B is forwarded through one link among the available communication links (1, 2 and 3) to respectively one of spine switches 100A, 1006 and 100C.

Leaf switch 200B implements a load balancing algorithm, to distribute traffic originating from the servers 300' on the first, second and third communication links (1, 2 and 3). Various load balancing algorithms well known in the art can be used for this purpose.

Upon reception of the first IP packet of an IP flow originating from one of the servers 300', leaf switch 200B assigns one among the three communication links (1, 2 or 3) to the IP flow. All the IP packets of the IP flow originating from the server 300' are forwarded through the assigned communication link. A well known in the art of IP networking, the IP packets of the IP flow directed towards the server 300' may or may not follow the same path as the IP packets of the IP flow originating for the server 300'.

As further illustrated in FIG. 4A, a communication link 1' connects spine switch 100A to leaf switch 200D, a communication link 2' connects spine switch 100B to leaf switch 200D, and a communication link 3' connects spine switch 100C to leaf switch 200D.

FIG. 4B illustrates three exemplary IP flows forwarded by leaf switch 200B.

A first IP flow originating from one of the servers 300', is received by leaf switch 200B and forwarded through communication link 1 to spine switch 100A. Spine switch 100A forwards the first IP flow to leaf switch 200D through communication link 1', and leaf switch 200D further forwards the first IP flow towards one among the servers 300".

A second IP flow originating from one of the servers 300', is received by leaf switch 200B and forwarded through communication link 2 to spine switch 100B. Spine switch 100B forwards the second IP flow to leaf switch 200D through communication link 2', and leaf switch 200D further forwards the second IP flow towards one among the servers 300".

A third IP flow originating from one of the servers 300', is received by leaf switch 200B and forwarded through communication link 3 to spine switch 100C. Spine switch 100C forwards the third IP flow to leaf switch 200D through communication link 3', and leaf switch 200D further forwards the third IP flow towards one among the servers 300".

FIGS. 4A and 4B illustrate how IP flows, originating from one of the servers 300' and having one of the servers 300" as destination, enter Fabric A via leaf switch 200B; are transported within Fabric A through one of a first, second and third communication paths (respectively links 1 and 1', links 2 and 2', and links 3 and 3'); and exit Fabric A via leaf switch 200D.

In case a failure is detected on one of the communication links 1,2 and 3 (e.g. communication link 2), the load balancing algorithm implemented by leaf switch 200B reallocates the traffic transiting through the failed communication link (e.g. communication link 2) to the remaining communication links (e.g. communication links 1 and 3).

FIG. 4C illustrates the case where a failure has been detected on communication link 2. The second IP flow is now forwarded through communication link 1 to spine switch 100A. Spine switch 100A forwards the second IP flow to leaf switch 200D through communication link 1'. Alternatively, the second IP flow may be forwarded through the communication link 3 to spine switch 100C. The choice of an alternative communication link in case of failure of one of the communication links depends on a particular implementation of the load balancing algorithm, and is out of the scope of the present disclosure.

Upon recovery of the failed communication link (e.g. recovery of communication link 2), the traffic which had been allocated to an alternative communication link (e.g. communication link 1 or 3) is reallocated to its original communication link (e.g. recovered communication link 2).

FIG. 4B also illustrates the case where communication link 2 is recovered after a certain amount of time following its failure. The second IP flow is forwarded again through communication link 2 to spine switch 100B (as was the case before the failure of communication link 2).

Figure 4D:
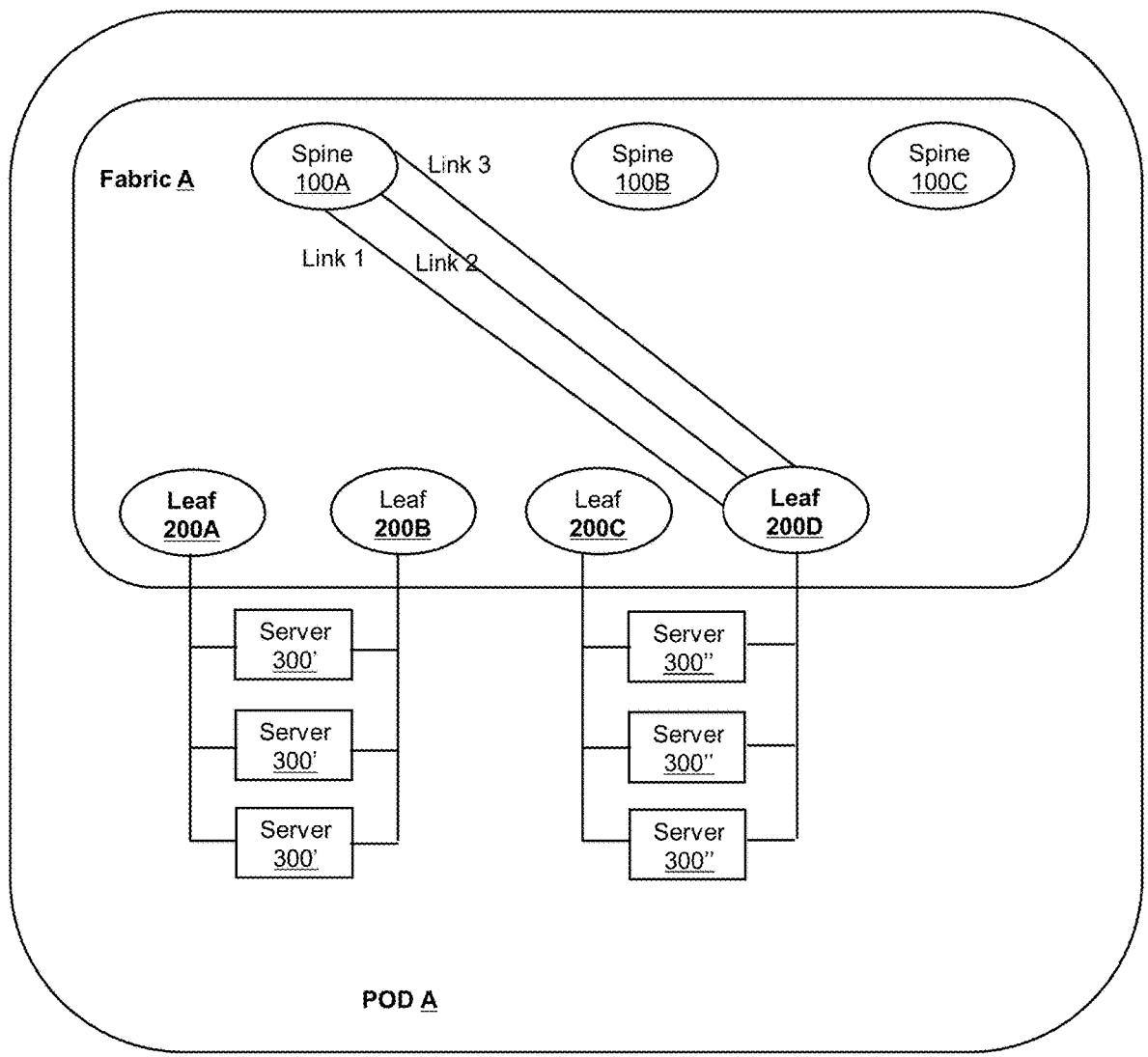

Reference is now made to FIG. 4D, which also represents the Fabric A and Pod A of FIG. 1A.

FIG. 4D represents another use case, where the load balancing is performed at the spine switch level. Traffic forwarded by spine switch 100A to leaf switch 200D can use any one of direct communication links 1, 2 and 3 between spine switch 100A and leaf switch 200D.

The load balancing algorithm implemented by spine switch 100A balances the traffic forwarded to leaf switch 200D between communication links 1, 2 and 3. Upon failure of one of the communication links (e.g. link 2), the traffic of the failed communication link (e.g. link 2) is re-allocated to the remaining communication links (e.g. links 1 and 3). Upon recovery of the failed communication link (e.g. link 2), the re-allocated traffic is allocated back to its original communication link (e.g. link 2).

Figure 5A:
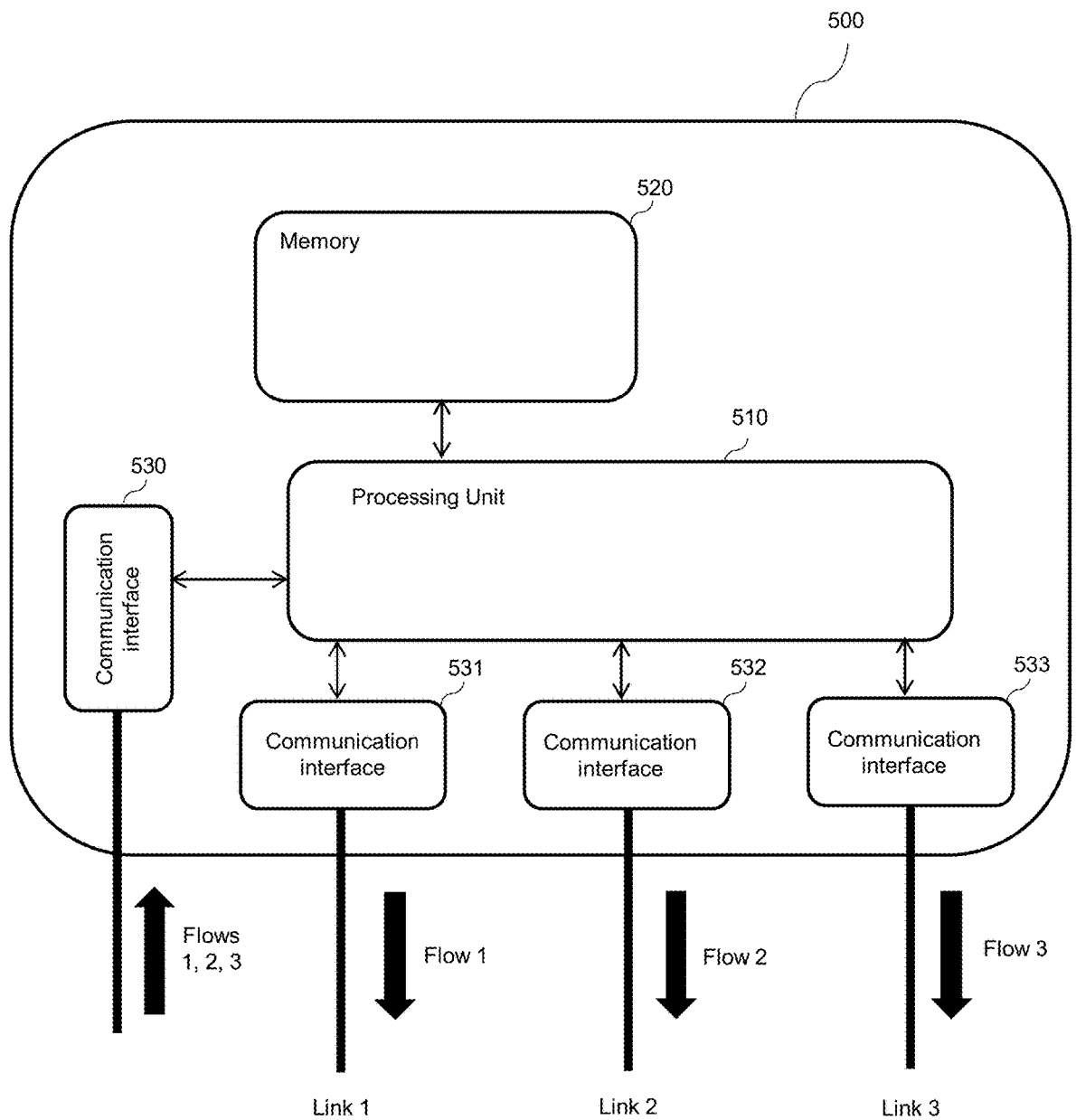
FIGS. 5A and 5B illustrate a schematic representation of a computing device performing link failure compensation and packet marking.
Figure 5B:
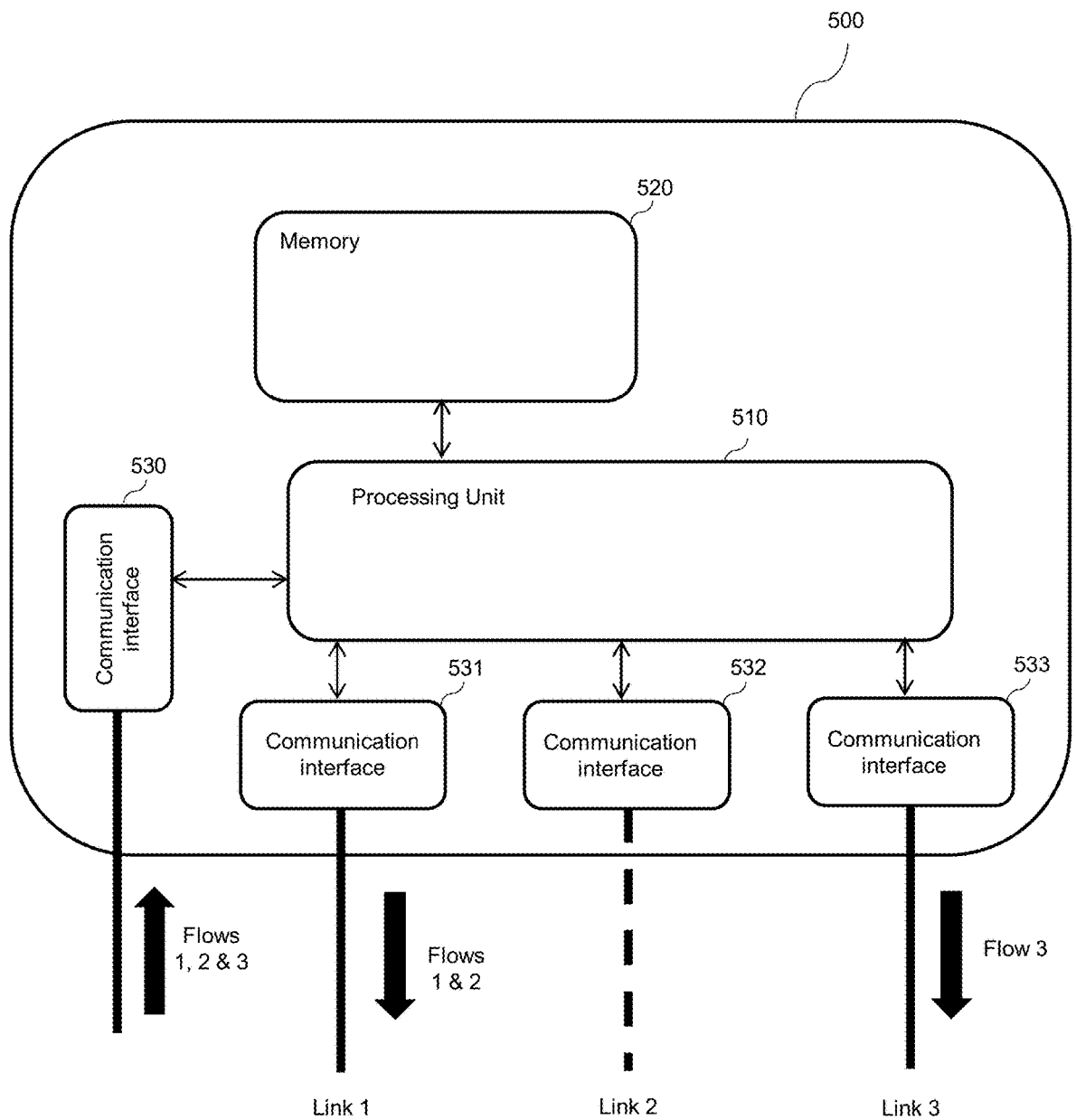

Referring now concurrently to FIGS. 4A-C, 5A and 5B, a computing device 500 is represented in FIGS. 5A and 5B. The computing device 500 is a generic functional representation of the leaf switch 200B illustrated in FIG. 4A-C.

However, the computing device 500 may also represent leaf switches 200A, 200C and 200D. Alternatively, the computing device 500 may also represent spine switches 100A, 100B and 100C.

The computing device 500 comprises a processing unit 510, memory 520, and a plurality of communication interfaces. Four communication interfaces 530, 531, 532 and 533 are represented in FIGS. 5A and 5B for illustration purposes. The computing device 500 may comprise additional components (not represented in FIGS. 5A and 5B for simplification purposes). For example, the computing device 500 may include a user interface and/or a display.

The processing unit 510 comprises one or more processors (not represented in FIGS. 5A and 5B) capable of executing instructions of a computer program. Each processor may further comprise one or several cores. The processing unit 510 generally also includes one or more dedicated processing components (e.g. a network processor, an Application Specific Integrated Circuits (ASIC), etc.) for performing specialized networking functions (e.g. packet forwarding).

The memory 520 stores instructions of computer program(s) executed by the processing unit 510, data generated by the execution of the computer program(s) by the processing unit 510, data received via the communication interfaces, etc. Only a single memory 520 is represented in FIGS. 5A and 5B, but the computing device 500 may comprise several types of memories, including volatile memory (such as Random Access Memory (RAM)) and non-volatile memory (such as a hard drive, Erasable Programmable Read-Only Memory (EPROM), Electrically-Erasable Programmable Read-Only Memory (EEPROM), etc.). TCAM (ternary content addressable memory) is another example of memory that is frequently used by networking equipment to store forwarding entries.

Each communication interface (e.g. 530, 531, 532 and 533) allows the computing device 500 to exchange data with other devices. For example, at least some of the communication interfaces correspond to the ports of the leaf switches 200 represented in FIG. 3. Examples of communication interfaces include standard (electrical) Ethernet ports, fiber optic ports, ports adapted for receiving Small Form-factor Pluggable (SFP) units, etc. The communication interfaces are generally of the wireline type; but may also include some wireless ones (e.g. a Wi-Fi interface). Each communication interface comprises a combination of hardware and software executed by the hardware, for implementing the communication functionalities of the communication interface. Alternatively, the combination of hardware and software for implementing the communication functionalities of the communication interface is at least partially included in the processing unit 210.

A given communication interface (e.g. 532) of the computing device 500 provides access to a corresponding communication link (e.g. link 2). The corresponding communication link (e.g. link 2) provides a communication channel for transporting data exchanged between the computing device 500 and other equipment of the Fabric A. Data transmitted by the computing device 500 via the given communication interface (e.g. 532) are transported over the corresponding communication link (e.g. link 2). Similarly, data received by the computing device 500 via the given communication interface (e.g. 532) are transported over the corresponding communication link (e.g. link 2). For example, in the case of an Ethernet communication interface, the corresponding communication link is an Ethernet cable having one extremity connected to the communication interface (e.g. Ethernet port) of the computing device 500 and the other extremity connected to a communication interface of another equipment of the Fabric A.

FIG. 5A corresponds to the use case represented in FIGS. 4A and 4B. For simplification purposes, the IP flows 1, 2 and 3 respectively originating from one of the servers 300' are received via the same communication interface 530. However, they may also be received via different communication interfaces of the computing device 500. IP flow 1 is forwarded via the communication interface 531 over communication link 1. IP flow 2 is forwarded via the communication interface 532 over communication link 2. IP flow 3 is forwarded via the communication interface 533 over communication link 3.

FIG. 5B corresponds to the use case represented in FIGS. 4A and 4C. A failure has been detected on communication link 2, and IP flow 2 is now forwarded via the communication interface 531 over communication link 1.

Figure 6A:
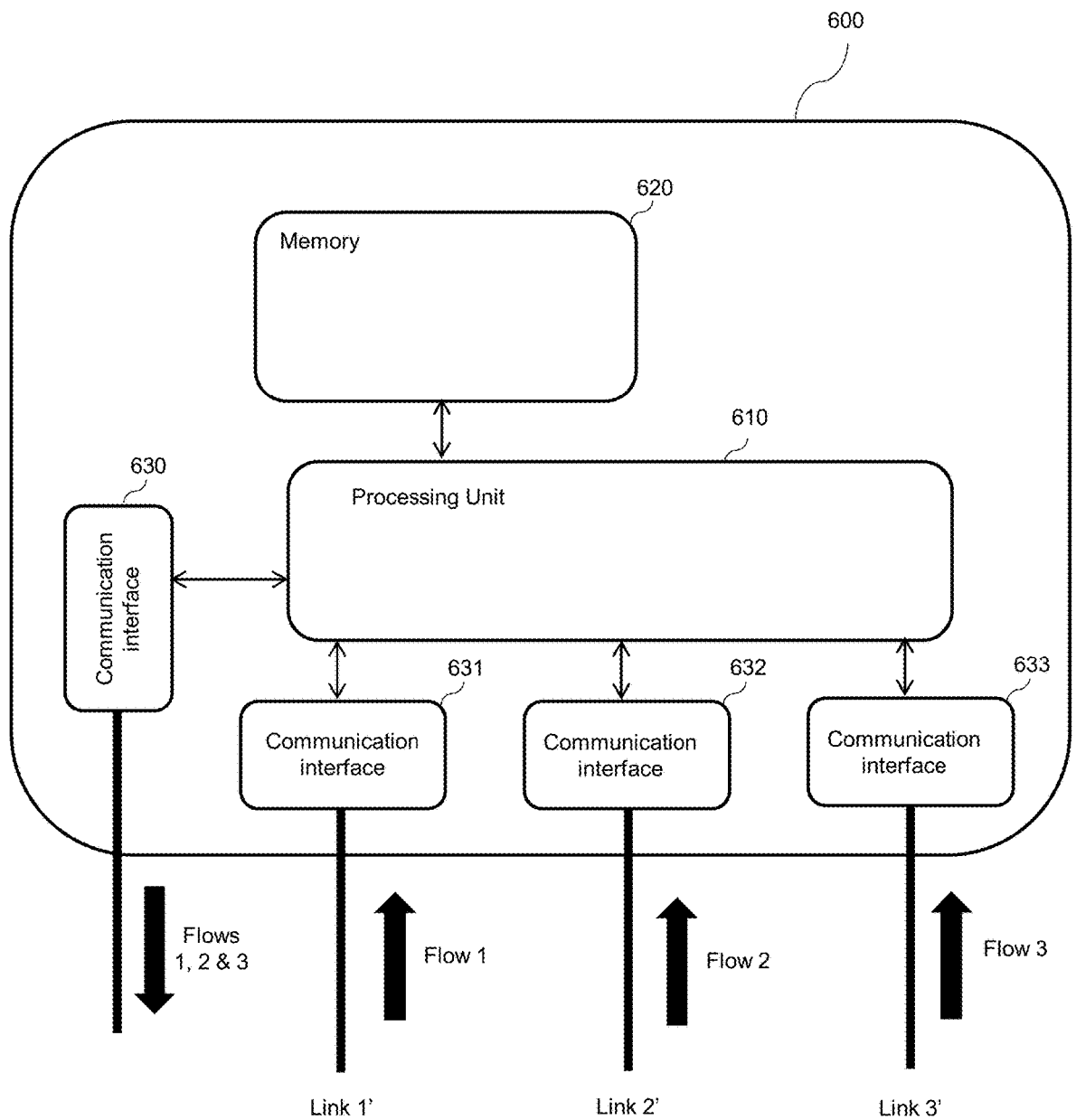
FIGS. 6A and 6B illustrate a schematic representation of a computing device implementing packet order enforcement based on packet marking.
Figure 6B:
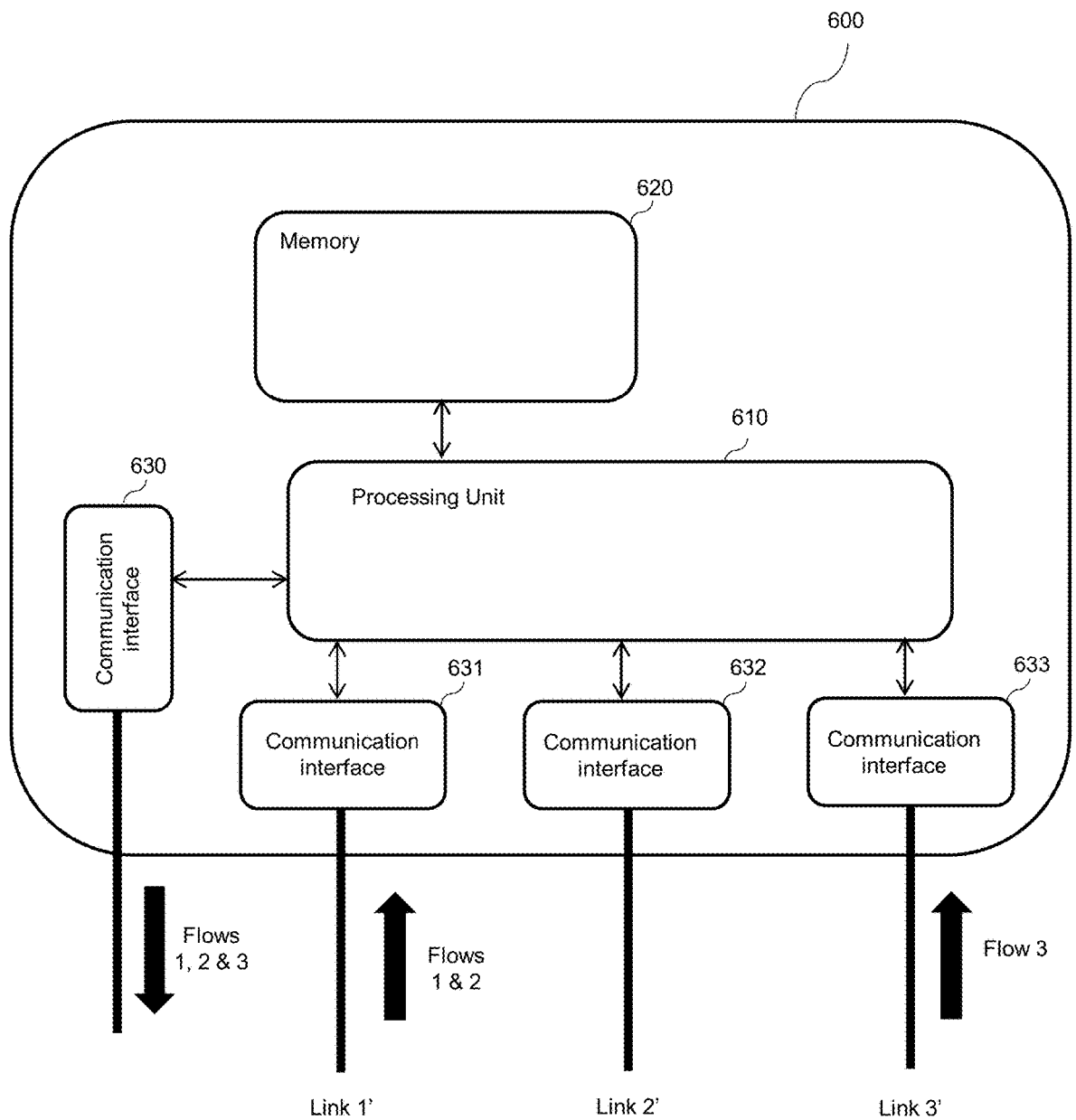

Referring now concurrently to FIGS. 4A-C, 6A and 6B, a computing device 600 is represented in FIGS. 6A and 6B. The computing device 600 is a generic functional representation of the leaf switch 200D illustrated in FIG. 4A-C. However, the computing device 600 may also represent leaf switches 200A, 200B and 200C. Alternatively, the computing device 500 may also represent spine switches 100A, 100B and 100C.

The computing device 600 comprises a processing unit 610, memory 620, and a plurality of communication interfaces. Four communication interfaces 630, 631, 632 and 633 are represented in FIGS. 6A and 6B for illustration purposes. The computing device 600 may comprise additional components (not represented in FIGS. 6A and 6B for simplification purposes). For example, the computing device 600 may include a user interface and/or a display.

The processing unit 610, the memory 620 and the plurality of communication interface (e.g. 630, 631, 632 and 633) are similar to the processing unit 510, the memory 520 and the plurality of communication interface (e.g. 530, 531, 532 and 533) of the computing device 500 represented in FIGS. 5A and 5B.

FIG. 6A corresponds to the use case represented in FIGS. 4A and 4B. IP flow 1 is received via the communication interface 631 from communication link 1'. IP flow 2 is received via the communication interface 632 from communication link 2'. IP flow 3 is received via the communication interface 633 from communication link 3'. For simplification purposes, the IP flows 1, 2 and 3 are respectively forwarded to one of the servers 300" via the same communication interface 630. However, they may also be forwarded via different communication interfaces of the computing device 600.

FIG. 6B corresponds to the use case represented in FIGS. 4A and 4C. A failure has been detected on communication link 2, and IP flow 2 is now received via the communication interface 631 from communication link 1'.

Figure 7A:
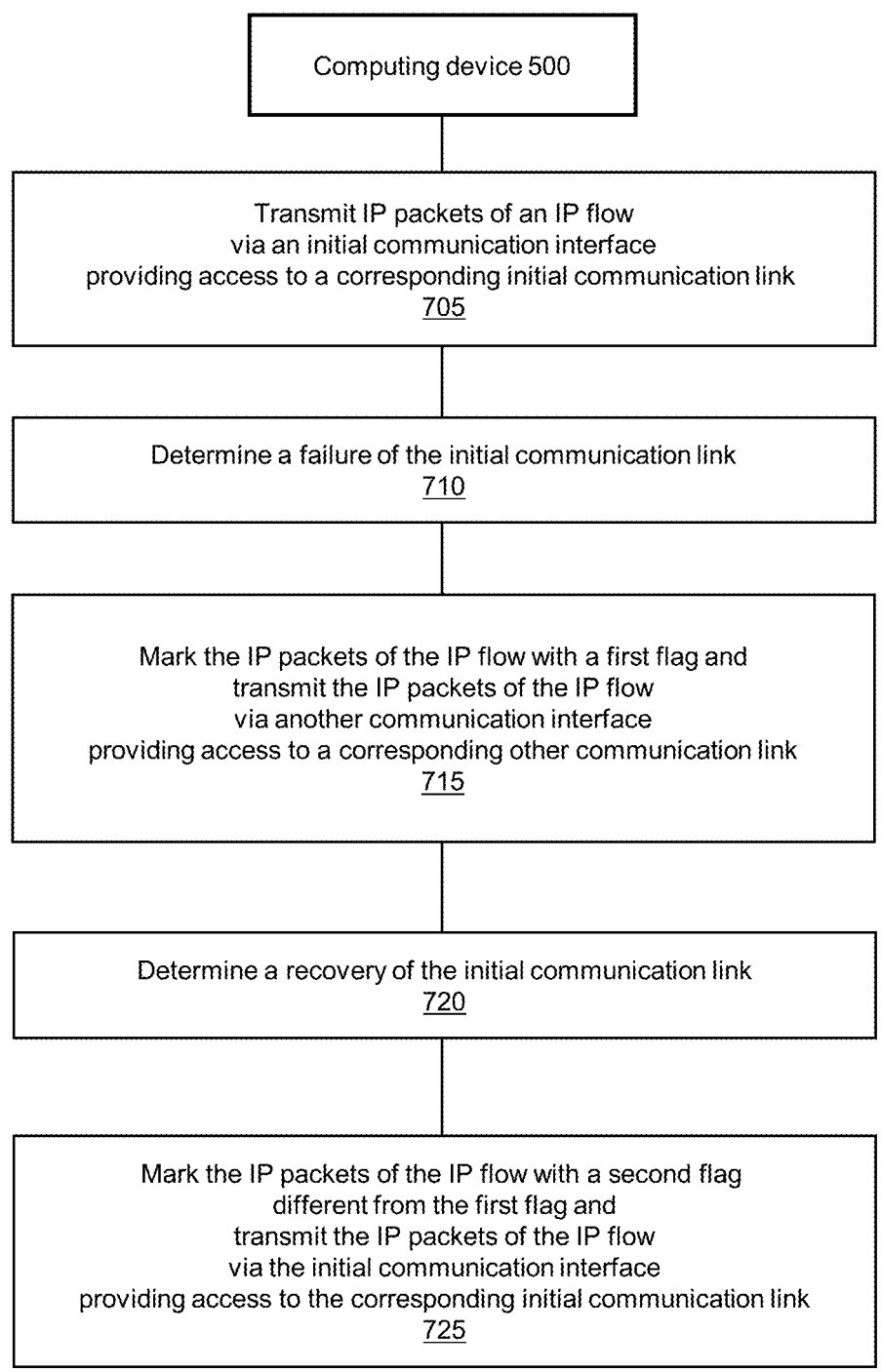
FIGS. 7A and 7B represent a method for enforcing packet order based on packet marking.
Figure 7B:
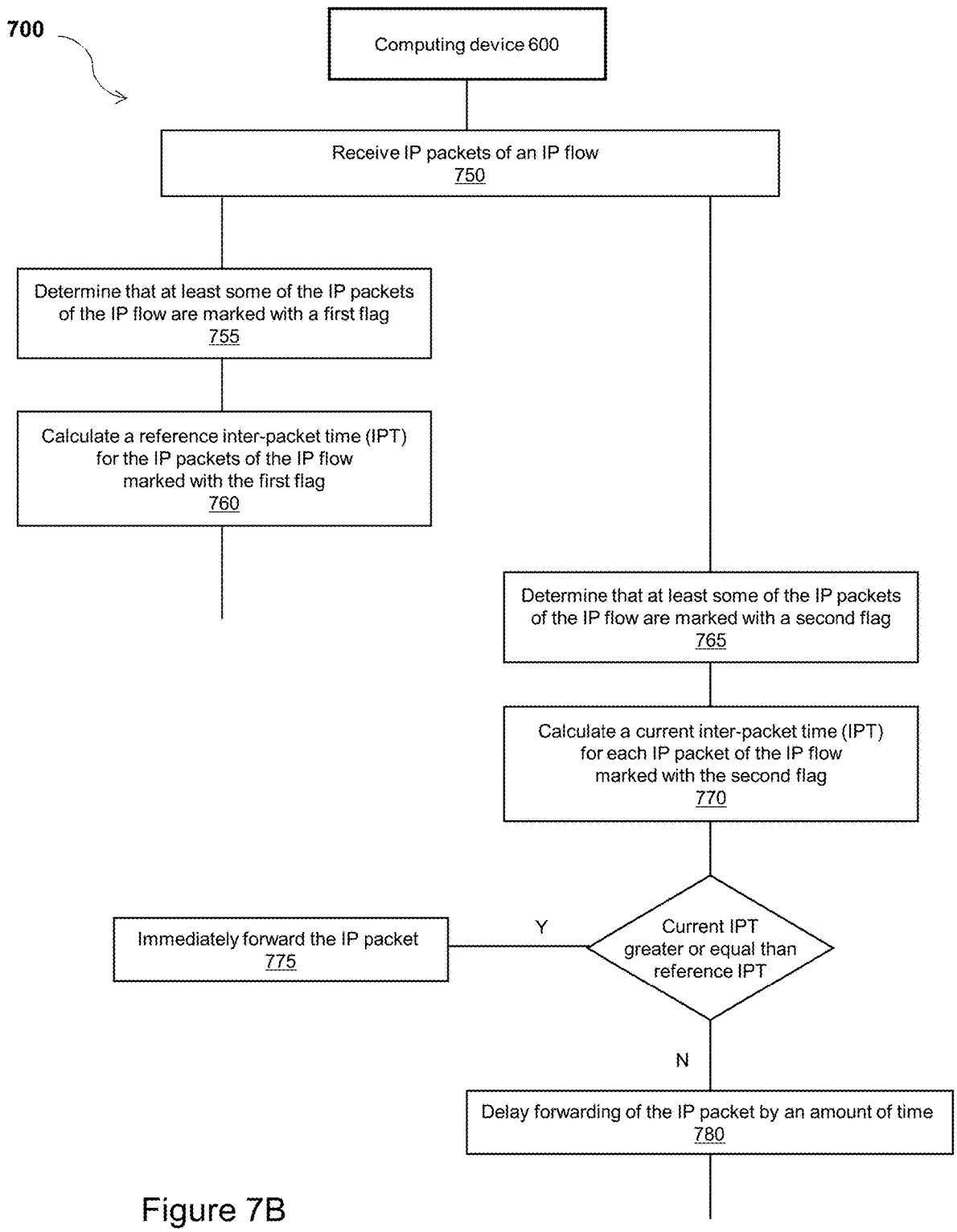

Referring now concurrently to FIGS. 4A, 4B, 4C, 5A, 5B, 6A, 6B, 7A and 7B, a method 700 for enforcing packet order based on packet marking is illustrated in FIGS. 7A and 7B. At least some of the steps of the method 700 are performed by the computing device 500 represented in FIGS. 5A-B and at least some of the steps of the method 700 are performed by the computing device 600 represented in FIGS. 6A-B.

A first dedicated computer program has instructions for implementing the steps of the method 700 performed by the computing device 500. The instructions are comprised in a non-transitory computer program product (e.g. the memory 520) of the computing device 500 The instructions, when executed by the processing unit 510 of the computing device 500, provide for enforcing packet order based on packet marking. The instructions are deliverable to the computing device 500 via an electronically-readable media such as a storage media (e.g. CD-ROM, USB key, etc.), or via communication links through one of the communication interfaces of the computing device 500.

A second dedicated computer program has instructions for implementing the steps of the method 700 performed by the computing device 600. The instructions are comprised in a non-transitory computer program product (e.g. the memory 620) of the computing device 600 The instructions, when executed by the processing unit 610 of the computing device 600, provide for enforcing packet order based on packet marking. The instructions are deliverable to the computing device 600 via an electronically-readable media such as a storage media (e.g. CD-ROM, USB key, etc.), or via communication links through one of the communication interfaces of the computing device 600.

The following steps of the method 700 are performed by the computing device 500 (e.g. leaf switch 200B).

The method 700 comprises the step 705 of transmitting IP packets of an IP flow via an initial communication interface of the computing device 500 providing access to a corresponding initial communication link. Step 705 is executed by the processing unit 510 of the computing device 500. For example, as illustrated in FIG. 5A, IP packets of the IP flow 2 are transmitted via the communication interface 532 providing access to communication link 2.

The method 700 comprises the step 710 of determining a failure of the initial communication link. Step 710 is executed by the processing unit 510 of the computing device 500. For example, as illustrated in FIG. 5B, communication link 2 becomes unavailable for transmitting IP packets due to a failure.

Various types of failure may occur, depending on the type of communication link (e.g. Ethernet cable, Wi-Fi channel, etc.). For example, one of the endpoints of an Ethernet cable may be disconnected. In another example, a Wi-Fi channel may be down, due to a failure of the corresponding Wi-Fi router.

The mechanism for detecting the failure of the communication link is out of the scope of the present disclosure, since it is well known in the art. The detection mechanism depends on the type of communication link, and is generally implemented by the communication interface (e.g. 532) providing access to the communication link (e.g. communication link 2) and the processing unit 510. For example, the processing unit 510 executes a communication software (e.g. a kernel driver) controlling operations of the communication interface 532, the communication software including functionalities for detecting a failure of the communication interface 532 itself, or of the communication link 2 used by the communication interface 532 for transmitting/receiving IP packets.

The method 700 comprises the step 715 of marking the IP packets of the IP flow with a first flag. Step 715 is executed by the processing unit 510 of the computing device 500, upon occurrence of step 710. For example, the IP packets of IP flow 2 are marked with the first flag.

Step 715 further comprises transmitting the IP packets of the IP flow marked with the first flag via a second communication interface of the computing device 500, providing access to a corresponding second communication link. For example, as illustrated in FIG. 5B, the IP packets of the IP flow 2 (marked with the first flag) are transmitted via the communication interface 531 providing access to the communication link 1.

Steps 710 and 715 may be implemented in different ways. The load balancing algorithm redistributes the load on all available links and mark all flows that changed their original path. In such a mechanism the load balancing algorithm may be implemented stateless (by detecting the flows that changed their path) or stateful (by keeping track of the flows that are marked in a table).

The method 700 comprises the step 720 of determining a recovery of the initial communication link. Step 720 is executed by the processing unit 510 of the computing device 500. For example, as illustrated in FIG. 5A, communication link 2 reverts to being available for transmitting IP packets due to a recovery from the failure detected at step 710.

The mechanism for detecting the recovery of the communication link is also out of the scope of the present disclosure, since it is well known in the art. The detection mechanisms of failure and recovery of a communication link are usually implemented by the same communication software (e.g. a kernel driver) controlling operations of the communication interface providing access to the communication link.

The method 700 comprises the step 725 of marking the IP packets of the IP flow with a second flag different from the first flag. Step 725 is executed by the processing unit 510 of the computing device 500, upon occurrence of step 720. For example, the IP packets of IP flow 2 are marked with the second flag.

Step 725 further comprises transmitting the IP packets of the IP flow marked with the second flag via the initial communication interface of the computing device 500, providing access to the initial communication link. For example, as illustrated in FIG. 5A, the IP packets of the IP flow 2 (marked with the second flag) are transmitted via the communication interface 532 providing access to the communication link 2.

Between steps 710 and 720, every IP packet of the IP flow 2 received by the computing device 500 (e.g. via the communication interface 530) is marked with the first flag, before forwarding via the communication interface 531.

After step 720, IP packets of the IP flow 2 received by the computing device 500 (e.g. via the communication interface 530) are marked with the second flag, before forwarding via the communication interface 2. However, the marking with the second flag only occurs for a given amount of time. In an exemplary implementation, the given amount of time is a configuration parameter stored in the memory 520. After the given amount of time has elapsed following occurrence of step 720, IP packets of the IP flow 2 received by the computing device 500 (e.g. via the communication interface 530) are no longer marked with the second flag, before forwarding via the communication interface 532. In another exemplary implementation, the given amount of time is calculated dynamically as being the average inter-packet time of the IP packets of the IP flow 2 marked with the first flag multiplied by an integer (e.g. three times the average inter-packet time). The calculation of the average inter-packet time will be detailed later in the description.

Figure 8:
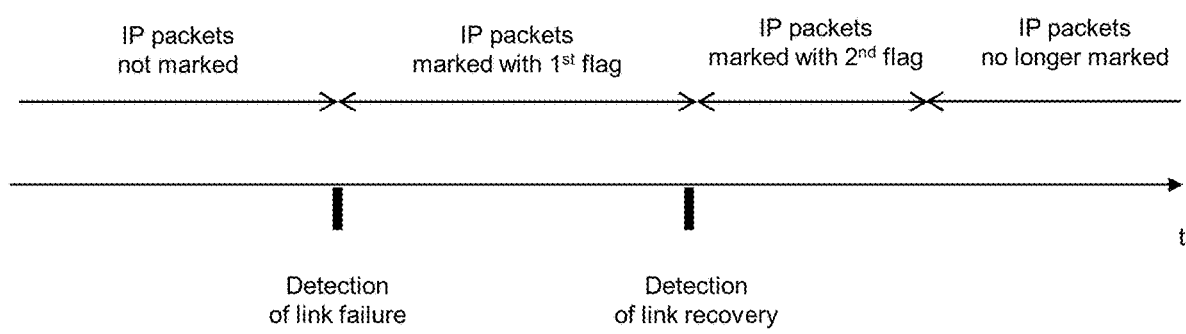
FIG. 8 illustrates a timeline of packet marking with respective first and second flags.

FIG. 8 represents a time frame indicating when and how the IP packets of the IP flow 2 are marked.

The field used for marking the IP packets with the first and second flags is implementation dependent. For example, in the case of IPv6 packets, a field of an extension header may be used for this purpose. The marking field only needs two bits (e.g. 01 for marking with the first flag, 10 for marking with the second flag, 00 or 11 for no marking).

For simplification purposes, a single IP flow (IP flow 2) initially transmitted via the communication interface 532 has been considered. However, steps 705 to 725 of the method 700 apply to a plurality of IP flows initially transmitted via the communication interface 532. Following step 710, the IP packets of each one of the IP flows is marked with the first flag and transmitted via a communication interface (e.g. 531 or 533) different from the initial communication interface 532. The choice of using communication interface 531 or 533 for the transmission of the IP packets marked with the first flag is out of the scope of the present disclosure, and depends on the load balancing algorithm as previously mentioned. Following step 720, the IP packets of each one of the IP flows is marked with the second flag (for a given amount of time) and transmitted via the initial communication interface 532.

Steps 705 to 725 of the method 700 have been illustrated with a failure and recovery of communication interface 532, and redirection of the traffic to communication interfaces 531 and 533 during the failure of communication interface 532. Steps 705 to 725 of the method 700 also apply to a failure and recovery of communication interface 531, and redirection of the traffic to communication interfaces 532 and 533 during the failure of communication interface 531. Steps 705 to 725 of the method 700 further apply to a failure and recovery of communication interface 533, and redirection of the traffic to communication interfaces 531 and 532 during the failure of communication interface 533. Steps 705 to 725 of the method 700 apply to a computing device 500 having any number of communication interfaces greater or equal to two, and applying a load balancing algorithm to any number of communication links greater or equal than two.

The computing device 500 may be adapted to determine a failure of a communication link (at step 710) to which it is not directly connected via a communication interface, and a recovery of this communication link (at step 720). For example, the computing device 500 is capable of determining at step 710 that communication link 2' has a failure, while communication link 2 is operational. The computing device 500 is capable of determining at step 720 that communication link 2' has recovered. Referring more specifically to FIG. 4A, the determination at steps 710 and 720 is based on information transmitted by spine switch 100B (or another equipment of the Fabric A) to leaf switch 200B related to the state of communication link 2'. The rest of the method 700 is similar to the case where the determination at steps 710 and 720 was related to the communication link 2. The computing device 500 only needs to know that communication link 2' is used for forwarding the IP flow 2, and that the IP flow 2 is initially transmitted through the communication interface 532 of the computing device 500.

The following steps of the method 700 are performed by the computing device 600 (e.g. leaf switch 200D).

The method 700 comprises the step 750 of receiving IP packets of the IP flow. Step 750 is executed by the processing unit 610 of the computing device 600. The communication interface of the computing device 600 through which the IP packets are received may vary over time. For example, as illustrated in FIGS. 6A and 6B, IP packets of the IP flow 2 are either received via the communication interface 632 providing access to communication link 2' or via the communication interface 631 providing access to communication link 1'.

More specifically, referring also to FIG. 8, the IP packets of IP flow 2 (not marked) are originally received via the communication interface 632. The IP packets of IP flow 2 marked with the first flag are received via the communication interface 631. The IP packets of IP flow 2 marked with the second flag are received via the communication interface 632, as well as the IP packets of IP flow 2 no longer marked after the given amount of time.

The method 700 comprises the step 755 of determining that at least some of the IP packets of the IP flow received at step 750 are marked with the first flag. Step 755 is executed by the processing unit 610 of the computing device 600. The IP packets determined to be marked at step 755 correspond to the IP packets transmitted at step 715.

The method 700 comprises the step 760 of calculating a reference inter-packet time for the IP packets of the IP flow which have been determined (at step 755) to be marked with the first flag. Step 760 is executed by the processing unit 610 of the computing device 600.

The inter-packet time for a given IP packet of the IP flow is an interval of time elapsed between the reception of the given IP packet and the reception of the previous IP packet of the IP flow (the IP packet of the IP flow received immediately before the given IP packet). Thus, the inter-packet time is calculated by considering two consecutively received IP packets of the same IP flow.

The determination of the time of reception of each IP packet of the IP flow by the processing unit 610 is implementation dependent. However, the determination of the time of reception is performed in the same manner for each IP packet of the IP flow, to ensure that the calculation of the inter-packet time is coherent among all the IP packets of the IP flow.

The reference inter-packet time is calculated by an algorithm taking into consideration a plurality of inter-packet times calculated for IP packets of the IP flow marked with the first flag. Some of the IP packets of the IP flow marked with the first flag may not be considered for the calculation of the reference inter-packet time. For example, if a given IP packet of the IP flow is marked with the first flag and the previous IP packet of the IP flow is also marked with the first flag, the inter-packet time for the given IP packet is calculated and taken into consideration by the algorithm for the calculation of the reference inter-packet time. But if a given IP packet of the IP flow is marked with the first flag but the previous IP packet of the IP flow is not marked with the first flag, the inter-packet time for the given IP packet is not calculated and not taken into consideration by the algorithm for the calculation of the reference inter-packet time. Following are exemplary implementations of the algorithm for determining the reference inter-packet time based on the plurality of calculated inter-packet times.

In a first exemplary implementation, the reference inter-packet time is the average of the inter-packet times calculated for the plurality of IP packets of the IP flow marked with the first flag. In a second exemplary implementation, the reference inter-packet time is the minimum value of the inter-packet times calculated for the plurality of IP packets of the IP flow marked with the first flag. In a third exemplary implementation, the reference inter-packet time is the moving average (e.g. simple, cumulative, weighted or exponential moving average) of the inter-packet times calculated for the plurality of IP packets of the IP flow marked with the first flag.

The method 700 comprises the step 765 of determining that at least some of the IP packets of the IP flow received at step 750 are marked with the second flag. Step 765 is executed by the processing unit 610 of the computing device 600. The IP packets determined to be marked at step 765 correspond to the IP packets transmitted at step 725.

The method 700 comprises the step 770 of calculating a current inter-packet time for each IP packet of the IP flow which has been determined (at step 765) to be marked with the second flag. Step 770 is executed by the processing unit 610 of the computing device 600.

The method 700 comprises the step 775 of immediately forwarding a given IP packet of the IP flow marked with the second flag, if the current inter-packet time calculated for the given IP packet is substantially greater or equal than the reference inter-packet time. Step 775 is executed by the processing unit 610 of the computing device 600.

The method 700 comprises the step 780 of delaying a forwarding of a given IP packet of the IP flow marked with the second flag by an amount of time, if the current inter-packet time calculated for the given IP packet is substantially lower than the reference inter-packet time. Step 780 is executed by the processing unit 610 of the computing device 600. For example, the amount of time is substantially equal to the difference between the reference inter-packet time and the current inter-packet time of the given IP packet.

The communication interface of the computing device 600 through which the IP packets are forwarded may vary. For example, as illustrated in FIGS. 6A and 6B, IP packets of the IP flow 2 are forwarded via the communication interface 630. For simplification purposes, the IP packets of the IP flows 1, 2 and 3 are all forwarded through the communication interface 630 in FIGS. 6A and 6B. However, different communication interfaces of the computing device 600 may be used for forwarding the IP packets of these IP flows towards the servers 300" represented in FIGS. 4A-C.

As mentioned previously, for simplification purposes, a single IP flow (IP flow 2) alternatively received via the communication interfaces 632 and 631 has been considered. However, steps 750 to 780 of the method 700 apply to a plurality of IP flows comprising IP packets marked with the first and second flags. The plurality of IP flows is initially received via the communication interface 632, and not marked. The plurality of IP flows is then received via one of the communication interfaces 631 and 633, and marked with the first flag (steps 750, 755 and 760). The plurality of IP flows is then received via the communication interface 632 again, and marked with the second flag (steps 750, 765, 770, 775 and 780).

Steps 705 to 725 may be implemented by any computing device 500 capable of implementing these steps. In the context of the Fabric A represented in FIGS. 3 and 4A-C, the computing device 500 generally consists of a leaf switch (e.g. leaf switch 200B), or alternatively a spine switch (e.g. spine switch 100A in FIG. 4D).

Steps 750 to 780 may be implemented by any computing device 600 capable of implementing these steps. In the context of the Fabric A represented in FIGS. 3 and 4A-C, the computing device 500 generally consists of a leaf switch (e.g. leaf switch 200D).

An IP flow is generally defined by a 5-tuple comprising a source IP address, a source port number, a destination IP address, a destination port number, and a transport protocol (User Datagram Protocol (UDP) or Transmission Control Protocol (TCP)). An IP packet with the characteristics defined in the 5-tuple belongs to the IP flow. For example, IP flow 2 may be defined by the IP address and port number of a server 300' (source IP address and port), the IP address and port number of a server 300" (destination IP address and port), and the TCP or UDP protocol. However, other criteria may be used for determining the IP packets belonging to an IP flow. For example, only the source and destination IP addresses of the IP packets may be used for identifying an IP flow. The method 700 is applicable to any definition of an IP flow. Additionally, the method is applicable to the IPv4 and IPv6 protocols.

Reference is now made concurrently to FIGS. 7A, 7B and 8. In an alternative implementation, after detection of the recovery of the communication link at step 720, the IP packets are simply no longer marked with the first flag at step 725. In this case, the second flag consists in an absence of marking, as was the case before the detection of the communication link failure at step 710. Thus, marking the IP packets of the IP flow with the second flag at step 725 consists in no longer marking the packets with the first flag. The marking field only needs one bit (e.g. 1 for marking with the first flag, 0 for no marking). In this case, step 765 consists in detecting that the IP packets are no longer marked with the first flag, while previous IP packets were marked with the first flag. Furthermore, steps 765 to 780 are only performed for a pre-defined (or dynamically determined) amount of time (e.g. the pre-defined amount of time is a configuration parameter stored in the memory 620 of the computing device 600).

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for enforcing packet order of transmitted packets based on packet marking, the method comprising:
   transmitting by a processing unit of a computing device Internet Protocol (IP) packets of an IP flow via a first communication interface of the computing device providing access to a corresponding first communication link;
   transmitting by the processing unit IP packets of at least one other IP flow via the first communication interface;
   determining by the processing unit a failure of the first communication link;
   upon determination of the failure, marking by the processing unit the IP packets of the IP flow with a first flag and transmitting by the processing unit the IP packets of the IP flow via a second communication interface of the computing device providing access to a corresponding second communication link, and marking by the processing unit the IP packets of the at least one other IP flow with the first flag and transmitting by the processing unit the IP packets of the at least one other IP flow via the second communication interface or another communication interface of the computing device, the other communication interface being different from the first communication interface and providing access to a corresponding communication link different from the first communication link;
   determining by the processing unit of the that the first communication link has recovered from the failure; and
   upon determination of the recovery from the failure, marking by the processing unit the IP packets of the IP flow with a second flag different from the first flag and transmitting by the processing unit the IP packets of the IP flow via the first communication interface providing access to the corresponding first communication link, and marking by the processing unit the IP packets of the at least one other IP flow with the second flag and transmitting by the processing unit the IP packets of the at least one other IP flow via the first communication interface providing access to the corresponding first communication link.

2. The method of claim 1, wherein the marking of the IP packets with the second flag occurs for a given amount of time.

3. The method of claim 1, wherein the computing device consists of a leaf networking equipment or a spine networking equipment of a fabric of a data center.

4. A method for enforcing packet order of received packets based on packet marking, the method comprising:
    receiving by a processing unit of a computing device Internet Protocol (IP) packets of an IP flow via at least one communication interface of the computing device;
    determining by the processing unit that at least some of the IP packets of the IP flow are marked with a first flag;
    calculating by the processing unit a reference inter-packet time for the IP packets of the IP flow marked with the first flag;
    determining by the processing unit that at least some of the IP packets of the IP flow are marked with a second flag;
    calculating by the processing unit a current inter-packet time for each IP packet of the IP flow marked with the second flag; and
    for each IP packet of the IP flow marked with the second flag, if the corresponding current inter-packet time is substantially greater or equal than the reference inter-packet time then immediately forwarding by the processing unit the IP packet via the at least one communication interface else delaying by the processing unit a forwarding of the IP packet via the at least one communication interface by an amount of time.

5. The method of claim 4, wherein the amount of time is substantially equal to the difference between the reference inter-packet time and the current inter-packet time.

6. The method of claim 4, wherein calculating the inter-packet time of a given IP packet of the IP flow consists in calculating an interval of time elapsed between the reception of a previous IP packet of the IP flow and the reception of the given IP packet, the previous and given IP packets being consecutively received.

7. The method of claim 6, wherein calculating the reference inter-packet time comprises calculating a plurality of inter-packet times for a corresponding plurality of IP packets of the IP flow marked with the first flag, and further calculating the reference inter-packet time based on the calculated plurality of inter-packet times.

8. The method of claim 7, wherein the reference inter-packet time is the average of the plurality of inter-packet times, a moving average of the plurality of inter-packet times, the maximum value of the plurality of inter-packet times or the minimum value of the plurality of inter-packet times.

* * * * *